(12) United States Patent
Haryu et al.

(10) Patent No.: US 9,194,048 B2
(45) Date of Patent: Nov. 24, 2015

(54) ELECTROCHEMICAL DEVICE

(75) Inventors: Eiji Haryu, Utsunomiya (JP); Masanori Okabe, Nerima-ku (JP); Koji Nakazawa, Utsunomiya (JP); Kenji Taruya, Utsunomiya (JP)

(73) Assignee: Honda Motor Co., Ltd., Tokyo (JP)

( * ) Notice: Subject to any disclaimer, the term of this patent is extended or adjusted under 35 U.S.C. 154(b) by 334 days.

(21) Appl. No.: 13/636,520

(22) PCT Filed: Mar. 17, 2011

(86) PCT No.: PCT/JP2011/056326
§ 371 (c)(1),
(2), (4) Date: Sep. 21, 2012

(87) PCT Pub. No.: WO2011/118482
PCT Pub. Date: Sep. 29, 2011

(65) Prior Publication Data
US 2013/0015059 A1    Jan. 17, 2013

(30) Foreign Application Priority Data

Mar. 23, 2010  (JP) ................................. 2010-066809

(51) Int. Cl.
*C25B 1/10* (2006.01)
*C25B 1/02* (2006.01)
(Continued)

(52) U.S. Cl.
CPC ... *C25B 1/04* (2013.01); *C25B 1/10* (2013.01);
*C25B 9/00* (2013.01); *C25B 9/10* (2013.01);
*H01M 8/0273* (2013.01); *Y02E 60/366* (2013.01)

(58) Field of Classification Search
CPC .............. C25B 9/00; C25B 9/04; C25B 1/08; C25B 1/10; H01M 8/0271; H01M 8/0273

USPC ............................ 205/628–639; 204/252–258
See application file for complete search history.

(56) References Cited

U.S. PATENT DOCUMENTS

2006/0237306 A1   10/2006   Nakazawa et al.
2006/0254907 A1   11/2006   Taruya et al.

FOREIGN PATENT DOCUMENTS

JP   2006-63419    3/2006
JP   2006-70322    3/2006
JP   2006-111924   4/2006

OTHER PUBLICATIONS

Supplementary European Search Report for Application No. 11759288.1, 6 pages, dated Jul. 31, 2013.
(Continued)

*Primary Examiner* — James Lin
*Assistant Examiner* — Brian W Cohen
(74) *Attorney, Agent, or Firm* — Nelson Mullins Riley & Scarborough LLP; Anthony A. Laurentano (57) ABSTRACT

In a unit cell that forms a water electrolysis device, which is an electrochemical device, an electrolyte membrane/electrode structure is sandwiched between an anode-side separator and a cathode-side separator. A load-applying mechanism is disposed between a cathode-side feeder and the cathode-side separator, while an anode-side feeder is set with a smaller contact area range than the aforementioned cathode-side feeder. The anode-side feeder and the cathode-side feeder are set with a larger contact area range than an anode electrode catalyst layer and a cathode electrode catalyst layer, and a contact surface that touches a solid polymer electrolyte membrane on the aforementioned anode-side feeder is disposed projecting farther to the side of the aforementioned solid polymer electrolyte membrane than a contact surface on the anode-side separator and a contact surface on a frame member.

5 Claims, 7 Drawing Sheets

(51) Int. Cl.
*C25B 9/10* (2006.01)
*C25B 9/00* (2006.01)
*C25B 1/04* (2006.01)
*H01M 8/02* (2006.01)

(56) References Cited

OTHER PUBLICATIONS

International Search Report for Application No. PCT/JP2011/056326, 1 page, dated Apr. 19, 2011.

ELECTROCHEMICAL DEVICE

RELATED APPLICATIONS

This application is a 35 U.S.C. 371 national stage filing of International Application No. PCT/JP2011/056326, filed Mar. 17, 2011, which claims priority to Japanese Patent Application No. 2010-066809 filed on Mar. 23, 2010 in Japan. The contents of the aforementioned applications are hereby incorporated by reference.

TECHNICAL FIELD

The present invention relates to an electrochemical device containing a first catalyst and a first current collector disposed on one surface of an electrolyte membrane, a second catalyst and a second current collector disposed on the other surface of the electrolyte membrane, a first flow path for supplying a first fluid formed between the first current collector and a first separator, and a second flow path, for collecting a second fluid generated by an electrolysis of the first fluid, formed between the second current collector and a second separator.

BACKGROUND ART

For example, a water electrolysis device is used to produce a hydrogen gas as a fuel gas for a power generation reaction in a fuel cell. The water electrolysis device contains a solid polymer electrolyte membrane for decomposing water to generate the hydrogen (and oxygen). Electrode catalyst layers are disposed on either side of the solid polymer electrolyte membrane to form a membrane-electrode assembly, and current collectors are disposed on either side of the membrane-electrode assembly to form a unit.

A plurality of the units are stacked, a voltage is applied to the stacking-direction ends, and the water is supplied to the anode-side current collector. Then, the water is decomposed to generate hydrogen ions (protons) at the anode side of the membrane-electrode assembly. The hydrogen ions are transferred through the solid polymer electrolyte membrane to the cathode side, and bonded with electrons to produce the hydrogen. Meanwhile, at the anode side, the oxygen generated simultaneously with the hydrogen is discharged together with the residual water from the unit.

Figure 7:
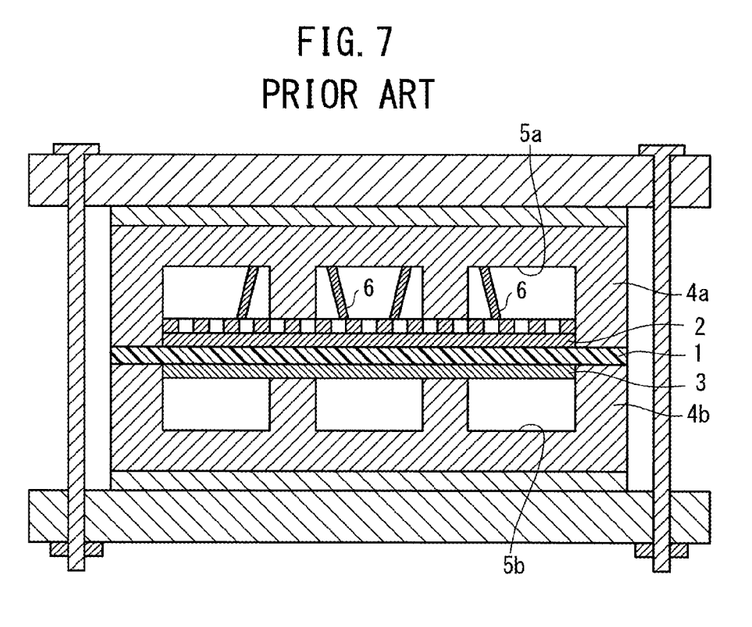
FIG. 7 is an explanatory view of a high-pressure hydrogen production device disclosed in Japanese Laid-Open Patent Publication No. 2006-070322.

Known water electrolysis devices include high-pressure hydrogen production devices capable of generating a high-pressure hydrogen (at a pressure of several tens MPa) at the cathode side. For example, as shown in FIG. 7, a high-pressure hydrogen production device disclosed in Japanese Laid-Open Patent Publication No. 2006-070322 contains a cathode current collector 2 and an anode current collector 3 disposed on either side of a solid polymer membrane 1, separators 4a and 4b, and flow paths 5a and 5b. When water is supplied to the flow path 5b in the anode-side separator 4b and the current collectors 2 and 3 are energized, the water is electrolyzed to generate the high-pressure hydrogen gas in the flow path 5a in the cathode-side separator 4a The high-pressure hydrogen production device further contains a disc spring 6 as a pressing means for pressing the cathode current collector 2 into tight contact with the solid polymer membrane 1. The disc spring 6 is disposed in the flow path 5a to press the cathode current collector 2 toward the solid polymer membrane 1. Therefore, the contact resistance between the solid polymer membrane 1 and the cathode current collector 2 is not increased even under the high pressure at the cathode side.

SUMMARY OF INVENTION

On the above solid polymer membrane 1, predetermined catalyst layers are formed on the anode and cathode sides. Thus, it is required that a satisfactory surface pressure is reliably applied to the catalyst layers by the cathode current collector 2 and the anode current collector 3 to ensure a desired electrolysis performance.

In view of such requirement, an object of the present invention is to provide an electrochemical device capable of utilizing current collectors for reliably applying a desired surface pressure to catalysts disposed on either side of an electrolyte membrane, thereby improving the electrolysis performance.

The present invention relates to an electrochemical device comprising an electrolyte membrane, a first catalyst and a first current collector disposed on one surface of the electrolyte membrane, a second catalyst and a second current collector disposed on an opposite surface of the electrolyte membrane, a first separator stacked on the first current collector, a first flow path, for supplying a first fluid, formed between the first current collector and the first separator, a second separator stacked on the second current collector, and a second flow path, for collecting a second fluid generated by an electrolysis of the first fluid, formed between the second current collector and the second separator, the pressure of the second fluid being higher than that of the first fluid.

In the electrochemical device, a load applying mechanism for pressing the second current collector onto the electrolyte membrane is interposed between the second current collector and the second separator, the first and second current collectors have different contact areas with the electrolyte membrane, and the contact surface between the electrolyte membrane and the first or second current collector whichever has the smaller contact area protrudes toward the electrolyte membrane from the contact surface between the first or second separator and the electrolyte membrane.

In the present invention, the contact surface between the current collector having the smaller contact area and the electrolyte membrane protrudes toward the electrolyte membrane from the contact surface between the separator and the electrolyte membrane. Therefore, when the first and second current collectors are pressed with the electrolyte membrane interposed therebetween, the current collector having the larger contact area does not come into contact with the separator on the current collector having the smaller contact area.

Thus, the desired surface pressure can be reliably applied by the first and second current collectors to the first and second catalysts disposed on either side of the electrolyte membrane, whereby the electrolysis performance can be improved even in the simple structure.

DESCRIPTION OF EMBODIMENTS

Figure 1:
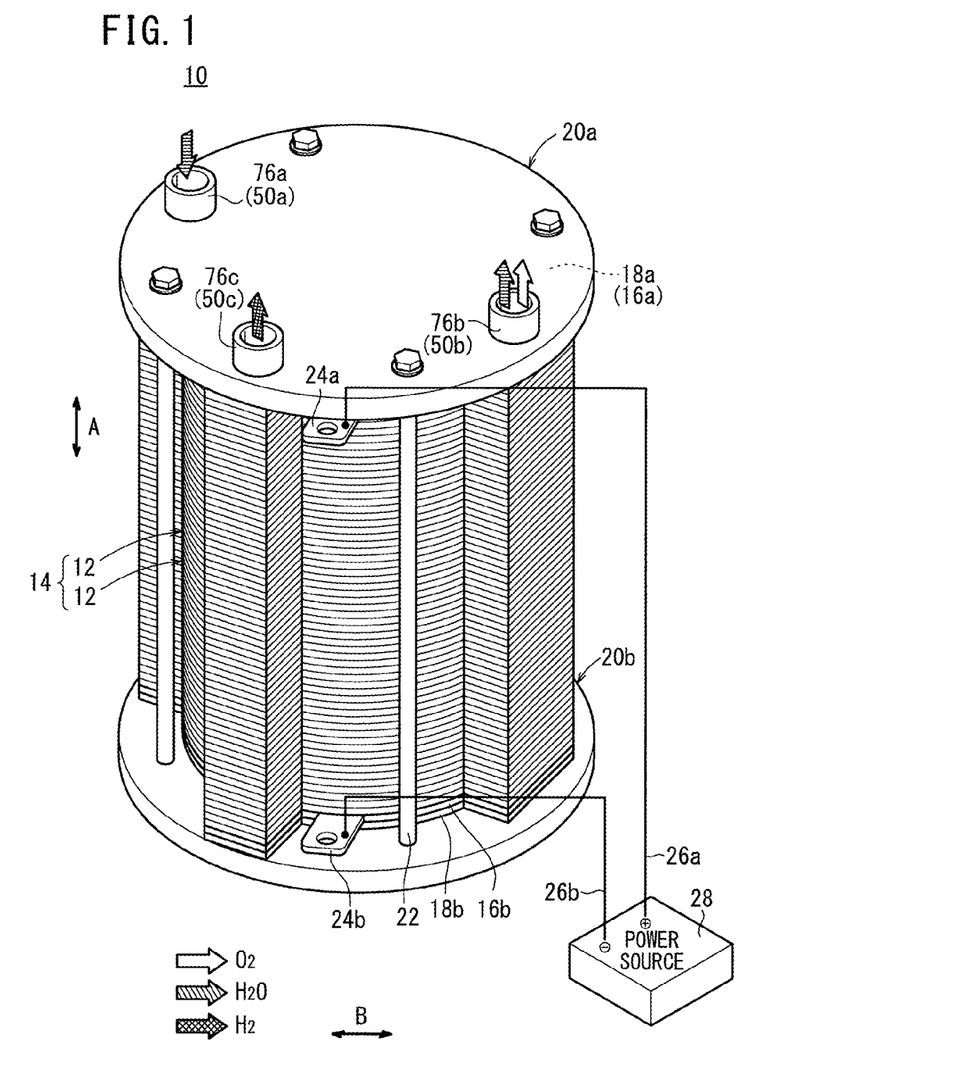
FIG. 1 is an explanatory perspective view of a water electrolysis device according to a first embodiment of the present invention.
Figure 2:
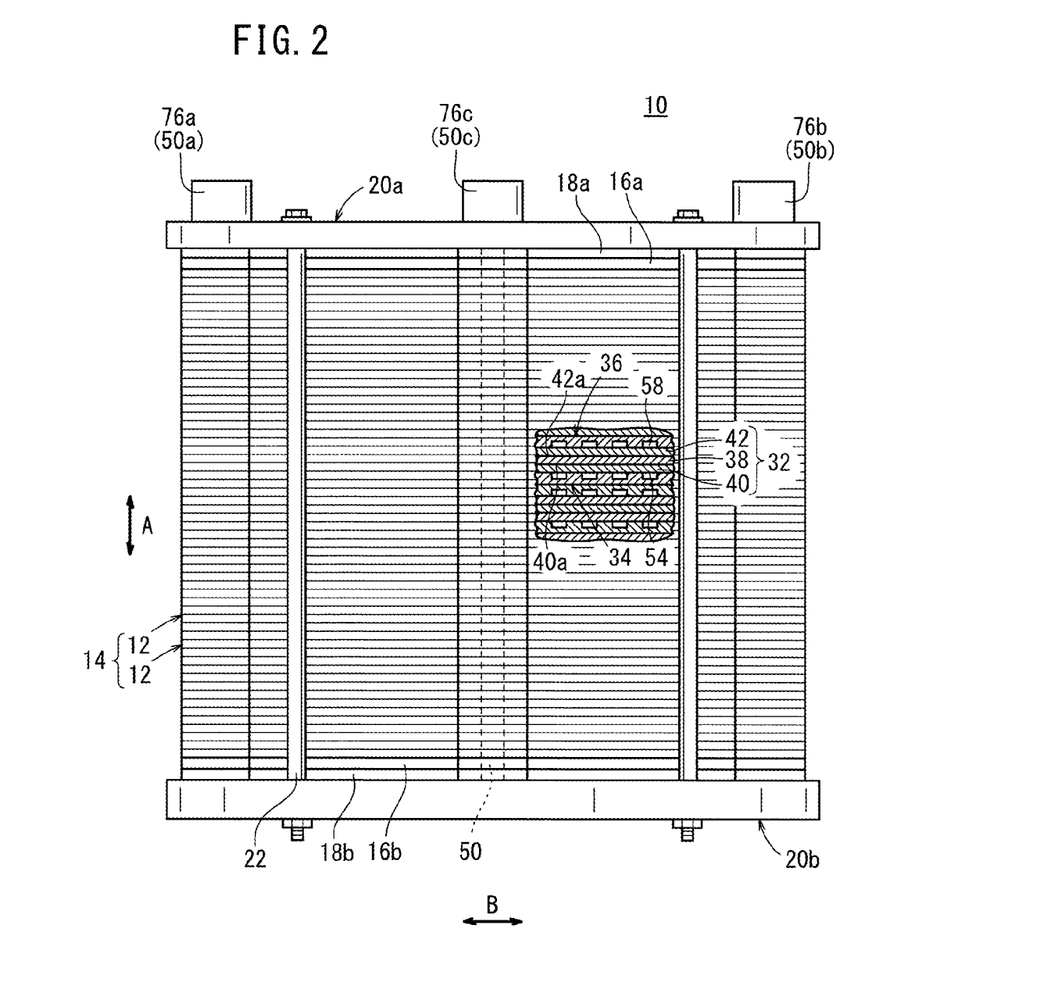
FIG. 2 is a partially sectioned side view of the water electrolysis device.

As shown in FIGS. 1 and 2, a water electrolysis device (electrochemical device) 10 according to a first embodiment of the present invention is a high-pressure hydrogen production device, which contains a stack 14 formed by stacking a plurality of unit cells 12 in the vertical direction (the arrow A direction) or the horizontal direction (the arrow B direction).

In one stacking-direction end (upper end) of the stack 14, a terminal plate 16a, an insulation plate 18a, and an end plate 20a are disposed in this order in the upward direction. Similarly, in the other stacking-direction end (lower end) of the stack 14, a terminal plate 16b, an insulation plate 18b, and an end plate 20b are disposed in this order in the downward direction.

In the water electrolysis device 10, for example, the disc-shaped end plates 20a and 20b are integrally fastened and fixed by four tie rods 22 extending in the arrow A direction. Alternatively, the water electrolysis device 10 may be integrally fastened by a box casing (not shown) containing the end plates 20a and 20b at the ends. In addition, though the overall shape of the water electrolysis device 10 is an approximately cylindrical shape in this embodiment, it may be selected from various shapes such as cubic shapes.

As shown in FIG. 1, terminals 24a and 24b protrude outward from side surfaces of the terminal plates 16a and 16b respectively. The terminals 24a and 24b are electrically connected to a power source 28 by wirings 26a and 26b. The positive electrode-side (anode-side) terminal 24a is connected to a positive post of the power source 28, while the negative electrode-side (cathode-side) terminal 24b is connected to a negative post of the power source 28.

Figure 3:
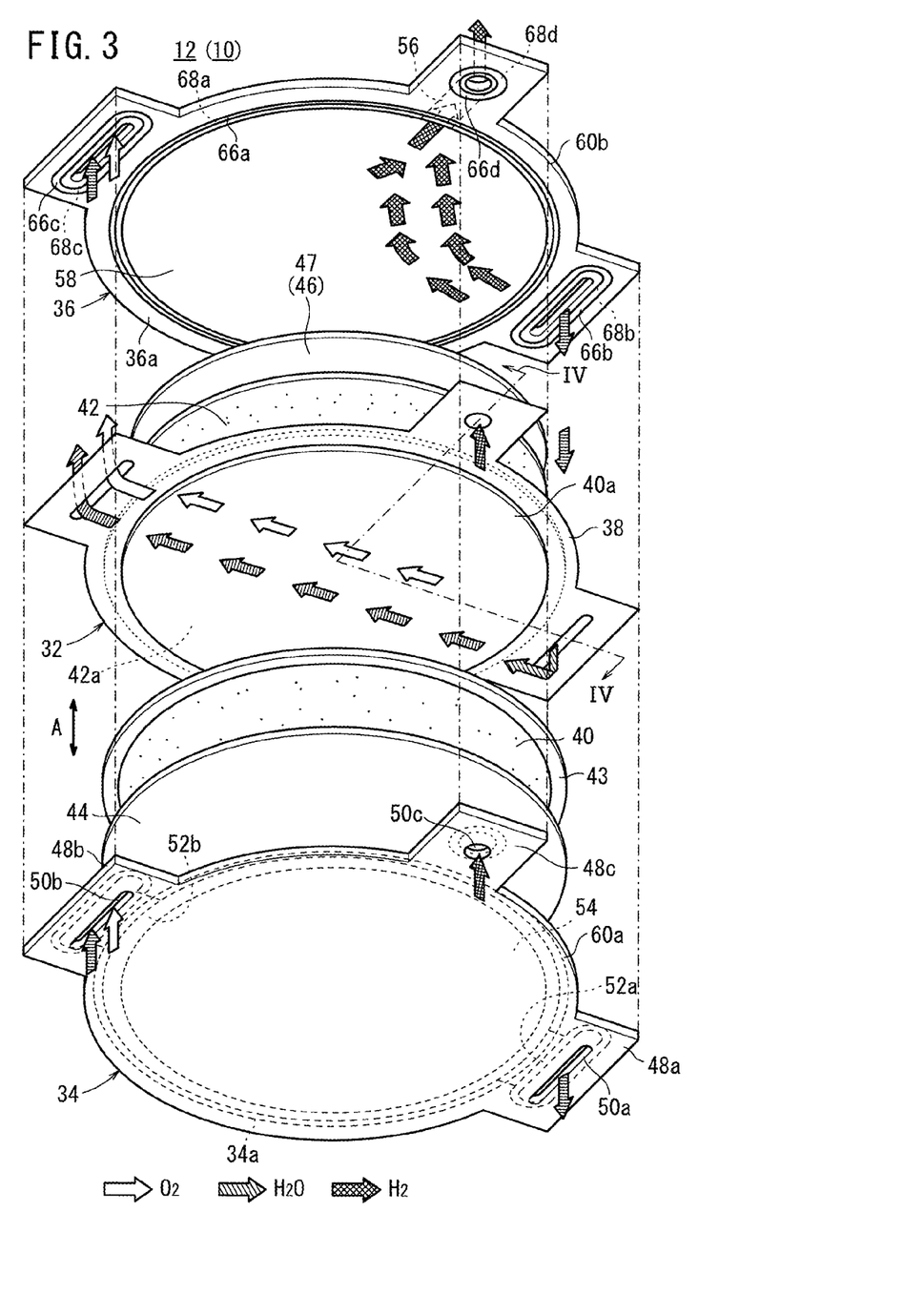
FIG. 3 is an explanatory exploded perspective view of a unit cell in the water electrolysis device.
Figure 4:
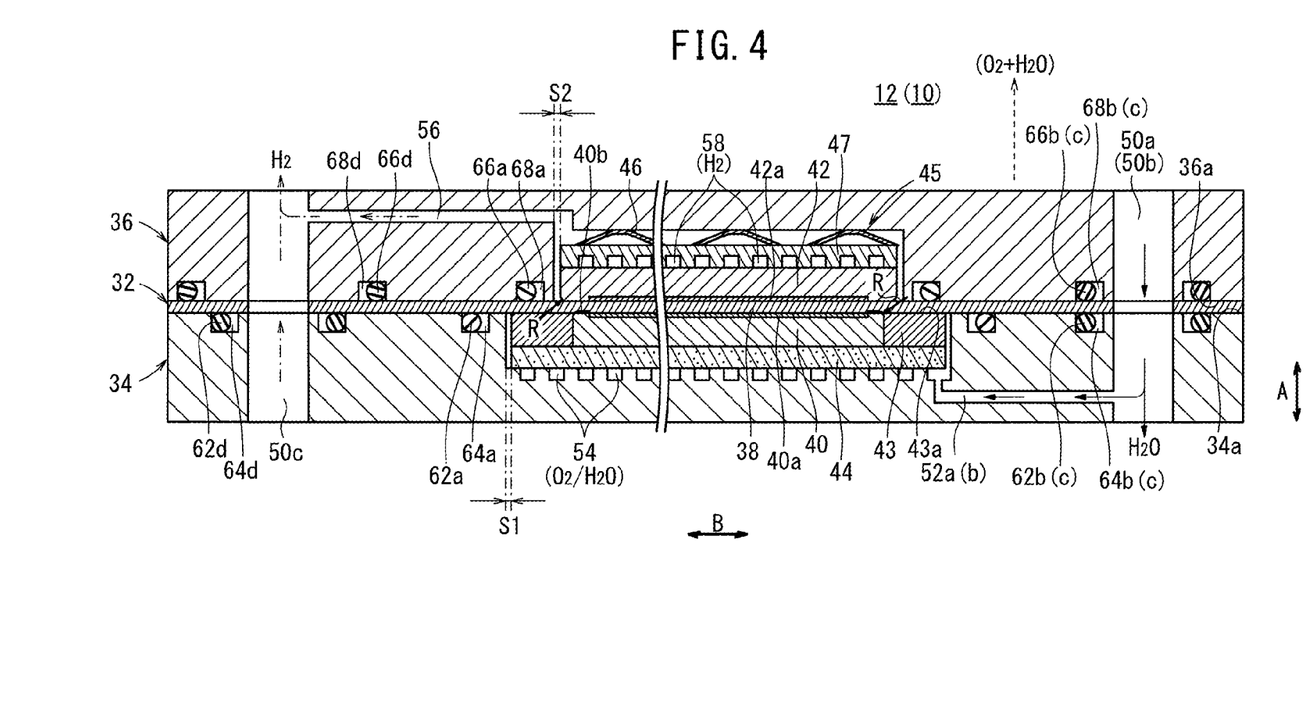
FIG. 4 is a cross-sectional view of the unit cell taken along the line IV-IV of FIG. 3.

As shown in FIGS. 2 to 4, the unit cell 12 contains an approximately disc-shaped membrane-electrode assembly 32, and further contains an anode-side separator (first separator) 34 and a cathode-side separator (second separator) 36 sandwiching the membrane-electrode assembly 32. The anode-side separator 34 and the cathode-side separator 36 have approximately disc shapes. For example, they may be composed of a carbon member or the like. Alternatively, they may be prepared by press-forming a steel plate, a stainless steel plate, a titanium plate, an aluminum plate, or a plated steel plate, and the metal plate may be subjected to an anti-corrosion surface treatment before the press forming. Furthermore, they may be prepared by cutting the metal plate and then subjecting the resultant to an anticorrosion surface treatment.

For example, the membrane-electrode assembly 32 contains a solid polymer electrolyte membrane 38 prepared by impregnating a thin perfluorosulfonic acid membrane with water, and further contains a circular anode-side current collector (first current collector) 40 and a circular cathode-side current collector (second current collector) 42 disposed on either side of the solid polymer electrolyte membrane 38. The outer edge of the solid polymer electrolyte membrane 38 protrudes outward from the outer peripheries of the anode-side current collector 40 and the cathode-side current collector 42 (see FIG. 4).

An anode catalyst layer (first catalyst) 40a and a cathode catalyst layer (second catalyst) 42a are disposed on either side of the solid polymer electrolyte membrane 38. For example, the anode catalyst layer 40a contains a Ru (ruthenium) catalyst, and the cathode catalyst layer 42a contains a platinum catalyst.

For example, the anode-side current collector 40 and the cathode-side current collector 42 contain a sintered body of a spherical atomized titanium powder (a porous conductor). The anode-side current collector 40 and the cathode-side current collector 42 each have a smooth surface portion formed by a grinding process and an etching treatment. The porosity thereof is 10% to 50%, more preferably 20% to 40%.

As shown in FIG. 4, the contact area between the anode-side current collector 40 and the solid polymer electrolyte membrane 38 is smaller than that between the cathode-side current collector 42 and the solid polymer electrolyte membrane 38, and the contact areas of the anode-side current collector 40 and the cathode-side current collector 42 are larger than the areas of the anode catalyst layer 40a and the cathode catalyst layer 42a respectively. The anode catalyst layer 40a and the cathode catalyst layer 42a have the same areas.

The anode-side current collector 40 is fitted in an inner periphery of a ring-shaped frame member 43. For example, the frame member 43 is composed of pure titanium, and the contact surface 43a between the frame member 43 and the solid polymer electrolyte membrane 38 and the contact surface 34a between the anode-side separator 34 and the membrane-electrode assembly 32 are in the same plane. The contact surface 40b between the anode-side current collector 40 and the solid polymer electrolyte membrane 38 protrudes toward the solid polymer electrolyte membrane 38 from the contact surface 34a of the anode-side separator 34 (and the contact surface 43a of the frame member 43).

A flow path plate 44 is interposed between the anode-side separator 34 and the anode-side current collector 40 (and the frame member 43). The flow path plate 44 has a plurality of pores or openings, or is composed of a porous conductor. A relatively small gap S1 is formed between the outer periphery of the flow path plate 44 (and the outer periphery of the frame member 43) and the inner periphery of the anode-side separator 34.

A load applying mechanism 45 for pressing the cathode-side current collector 42 onto the solid polymer electrolyte membrane 38 is disposed between the cathode-side current collector 42 and the cathode-side separator 36. The load applying mechanism 45 contains a disc spring 46, and a load is applied to the cathode-side current collector 42 by a disc spring holder 47 on the disc spring 46. A relatively large gap S2 (>the gap S1) is formed between the outer periphery of the cathode-side current collector 42 (and the outer periphery of the disc spring holder 47) and the inner periphery of the cathode-side separator 36. R-shaped portions are formed on corners facing the solid polymer electrolyte membrane 38 on the outer peripheries of the anode-side current collector 40 and the cathode-side current collector 42.

As shown in FIG. 3, a first projection 48a, a second projection 48b, and a third projection 48c, protruding outward in the separator surface direction, are formed on the outer periphery of the unit cell 12. A water supply through hole 50a for supplying a water (pure water) as a first fluid is formed in the first projection 48a continuously in the arrow A direction (the stacking direction).

A discharge through hole 50b for discharging oxygen generated by a reaction and the used water is formed in the second projection 48b continuously in the arrow A direction. A hydrogen through hole 50c for transferring hydrogen (a second fluid) generated by the reaction is formed in the third projection 48c continuously in the arrow A direction (the stacking direction).

As shown in FIGS. 3 and 4, a supply passage 52a connected to the water supply through hole 50a and a discharge passage 52b connected to the discharge through hole 50b are formed in the anode-side separator 34. A first flow path 54 is connected to the supply passage 52a and the discharge passage 52b on the surface 34a of the anode-side separator 34 facing the membrane-electrode assembly 32. The first flow path 54 is formed within a region corresponding to the contact area of the anode-side current collector 40.

A discharge passage 56 connected to the hydrogen through hole 50c is formed in the cathode-side separator 36. A second flow path 58 is connected to the discharge passage 56 on a surface 36a of the cathode-side separator 36 (substantially the disc spring holder 47) facing the membrane-electrode assembly 32. The second flow path 58 is formed within a region corresponding to the contact area of the cathode-side current collector 42.

The peripheral edges of the anode-side separator 34 and the cathode-side separator 36 are integrated by sealants 60a and 60b. The sealants 60a and 60b may contain a seal material, a cushion material, or a packing material of an EPDM, an NBR, a fluorine-containing rubber, a silicone rubber, a fluorosilicone rubber, a butyl rubber, a natural rubber, a styrene rubber, a chloroprene rubber, or an acrylic rubber, etc.

As shown in FIGS. 3 and 4, a second seal groove 64a is circularly formed outside the first flow path 54 and the anode-side current collector 40 on the surface 34a of the anode-side separator 34 facing the membrane-electrode assembly 32, and a second sealant 62a is disposed therein.

A third seal groove 64b, a fourth seal groove 64c, and a fifth seal groove 64d are circularly formed outside the water supply through hole 50a, the discharge through hole 50b, and the hydrogen through hole 50c on the surface 34a, and a third sealant 62b, a fourth sealant 62c, and a fifth sealant 62d are disposed therein. For example, the second sealant 62a, the third sealant 62b, the fourth sealant 62c and the fifth sealant 62d are O rings.

A first seal groove 68a is circularly formed outside the second flow path 58 and the cathode-side current collector 42 on the surface 36a of the cathode-side separator 36 facing the membrane-electrode assembly 32, and a first sealant 66a is disposed therein.

A third seal groove 68b, a fourth seal groove (fourth seal portion) 68c, and a fifth seal groove 68d are circularly formed outside the water supply through hole 50a, the discharge through hole 50b, and the hydrogen through hole 50c on the surface 36a, and a third sealant 66b, a fourth sealant 66c, and a fifth sealant 66d are disposed therein. For example, the first sealant 66a and the third sealant 66b to the fifth sealant 66d are O rings.

The circular second seal groove 64a around the anode-side current collector 40 and the circular first seal groove 68a around the cathode-side current collector 42 are formed in different positions in the stacking direction (the arrow A direction) with the solid polymer electrolyte membrane 38 interposed therebetween.

The circular fifth seal groove 64d and the circular fifth seal groove 68d around the hydrogen through hole 50c are formed in different positions in the arrow A direction with the solid polymer electrolyte membrane 38 interposed therebetween.

As shown in FIGS. 1 and 2, pipes 76a, 76b, and 76c are connected to the water supply through hole 50a, the discharge through hole 50b, and the hydrogen through hole 50c, respectively on the end plate 20a. A back pressure valve or a solenoid valve (not shown) is formed in the pipe 76c to maintain the pressure of the hydrogen in the hydrogen through hole 50c at a high level. A clamping force is applied to the end plates 20a and 20b by a clamping force applying unit (not shown), and the end plates 20a and 20b are fastened by the tie rods 22 in this state.

The operation of the water electrolysis device 10 will be described below.

As shown in FIG. 1, the water is supplied from the pipe 76a to the water supply through hole 50a in the water electrolysis device 10. A voltage is applied to the terminals 24a and 24b on the terminal plates 16a and 16b by the power source 28 electrically connected thereto. Then, as shown in FIG. 3, in each of the unit cells 12, the water is supplied from the water supply through hole 50a to the first flow path 54 on the anode-side separator 34, and is transferred along the anode-side current collector 40.

The water is electrically decomposed on the anode catalyst layer 40a to generate hydrogen ions, electrons, and oxygen. The hydrogen ions generated by the positive electrode reaction are transferred through the solid polymer electrolyte membrane 38 to the cathode catalyst layer 42a, and bonded with electrons to produce hydrogen.

Thus, the hydrogen flows through the second flow path 58 between the cathode-side separator 36 and the cathode-side current collector 42. The pressure of the hydrogen is maintained higher than the pressure in the water supply through hole 50a, whereby the hydrogen can be transferred in the hydrogen through hole 50c and discharged to the outside of the water electrolysis device 10. Meanwhile, the oxygen generated by the reaction and the used water flow in the first flow path 54, and are discharged from the discharge through hole 50b to the outside of the water electrolysis device 10.

In the first embodiment, as shown in FIG. 4, at the cathode side, in which the high-pressure hydrogen is generated, the load applying mechanism 45 is disposed between the cathode-side current collector 42 and the cathode-side separator 36. The contact area between the cathode-side current collector 42 and the solid polymer electrolyte membrane 38 is larger than that between the anode-side current collector 40 and the solid polymer electrolyte membrane 38, and the contact areas of the cathode-side current collector 42 and the anode-side current collector 40 are larger than the areas of the cathode catalyst layer 42a and the anode catalyst layer 40a respectively.

Furthermore, the contact surface 40b between the anode-side current collector 40 having the smaller contact area and the solid polymer electrolyte membrane 38 protrudes toward the solid polymer electrolyte membrane 38 from the contact surface 34a of the anode-side separator 34 (and the contact surface 43a of the frame member 43). Therefore, when the cathode-side current collector 42 is pressed toward the anode-side current collector 40 by the load applying mechanism 45 and the high-pressure hydrogen, the pressing force of the cathode-side current collector 42 is not distributed to the contact surface 34a of the anode-side separator 34 and the contact surface 43a of the frame member 43, and can be applied only to the contact surface 40b of the anode-side current collector 40.

Thus, a desired surface pressure can be reliably applied by the anode-side current collector 40 and the cathode-side current collector 42 to the anode catalyst layer 40a and the cathode catalyst layer 42a formed on either side of the solid polymer electrolyte membrane 38, whereby the electrolysis performance can be improved even in the simple structure.

In addition, the relatively large gap S2 is formed between the outer periphery of the cathode-side current collector 42 and the inner periphery of the cathode-side separator 36. Therefore, the load of the load applying mechanism (the disc spring 46) on the cathode-side current collector 42 can be applied only to the anode-side current collector 40, and a displacement of the cathode-side current collector 42 can be absorbed.

Figure 5:
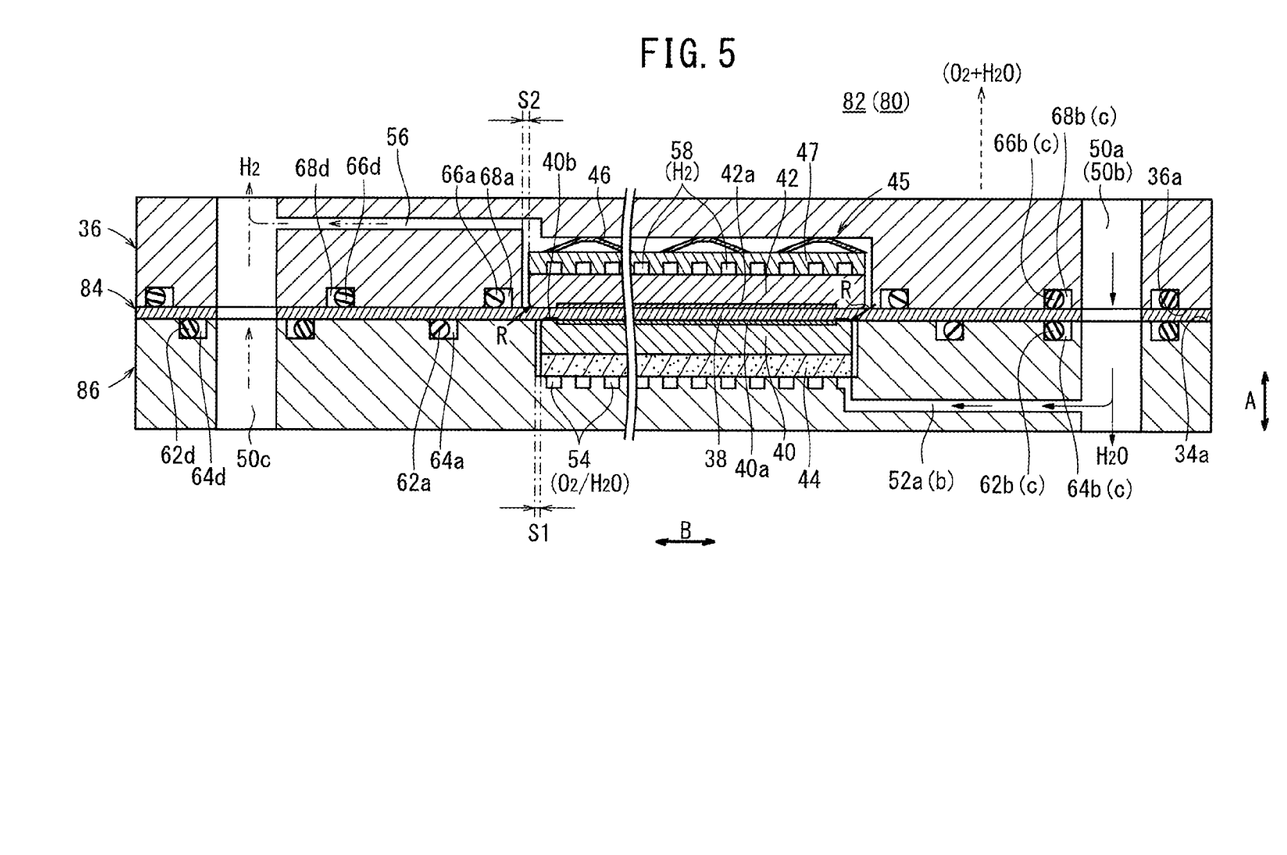
FIG. 5 is an explanatory cross-sectional view of a unit cell in a water electrolysis device according to a second embodiment of the present invention.

FIG. 5 is an explanatory cross-sectional view of a unit cell 82 in a water electrolysis device 80 according to a second embodiment of the present invention.

The same components are marked with the same numerals in the unit cell 82 of the second embodiment and the unit cell 12 of the first embodiment, and detailed explanations thereof are omitted in the second embodiment. Also in a third embodiment to be hereinafter described, the detailed explanations are omitted.

The unit cell 82 contains an anode-side separator 86 and the cathode-side separator 36 sandwiching a membrane-electrode assembly 84. In the membrane-electrode assembly 84, the anode catalyst layer 40a and the cathode catalyst layer 42a are formed on either side of the solid polymer electrolyte membrane 38, and the anode-side current collector 40 and the cathode-side current collector 42 are disposed thereon.

The anode-side current collector 40 is supported on the flow path plate 44 without forming the frame member on its outer periphery. The inner wall surface of the anode-side separator 86 is close to the outer peripheries of the anode-side current collector 40 and the flow path plate 44. Thus, the anode-side separator 86 extends to a position corresponding to the first seal groove 68a on the cathode-side separator 36.

In the second embodiment, the contact surface 40b of the anode-side current collector 40 having the smaller contact area protrudes toward the solid polymer electrolyte membrane 38 from the contact surface 34a of the anode-side separator 86. Consequently, the advantageous effects in the first embodiment can be achieved also in the second embodiment.

Figure 6:
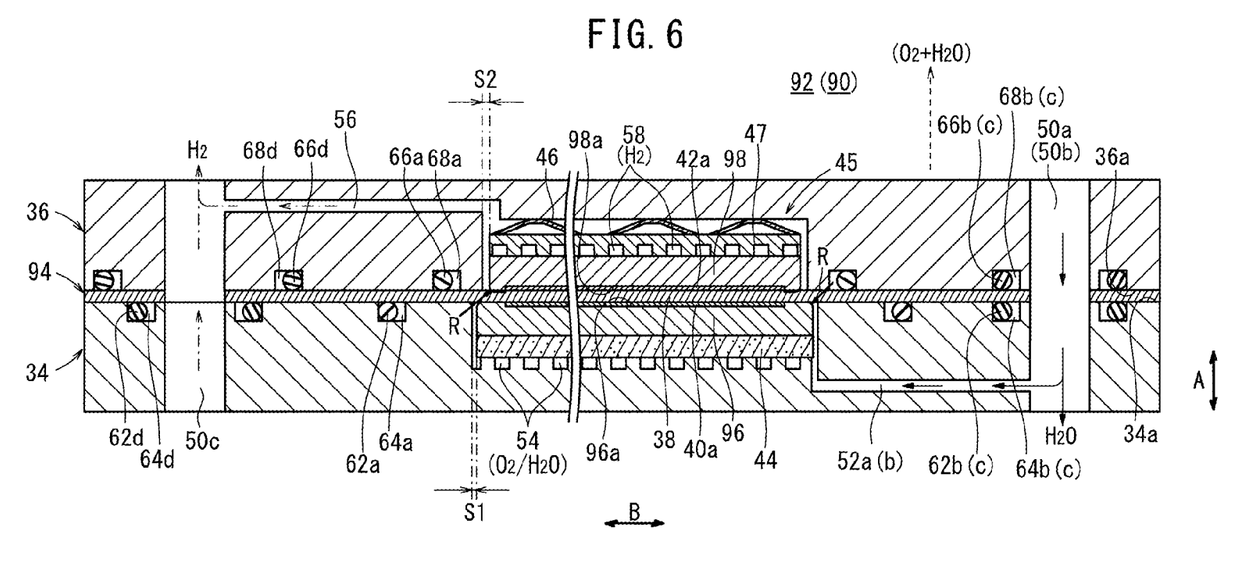
FIG. 6 is an explanatory cross-sectional view of a unit cell in a water electrolysis device according to a third embodiment of the present invention.

FIG. 6 is an explanatory cross-sectional view of a unit cell 92 in a water electrolysis device 90 according to a third embodiment of the present invention.

The unit cell 92 contains the anode-side separator 34 and the cathode-side separator 36 sandwiching a membrane-electrode assembly 94. In the membrane-electrode assembly 94, the anode catalyst layer 40a and the cathode catalyst layer 42a are formed on either side of the solid polymer electrolyte membrane 38, and an anode-side current collector 96 and a cathode-side current collector 98 are stacked thereon.

The contact surface 96a between the anode-side current collector 96 and the solid polymer electrolyte membrane 38 and the contact surface 34a of the anode-side separator 34 are in the same plane. The contact surface 98a between the cathode-side current collector 98 and the solid polymer electrolyte membrane 38 protrudes toward the solid polymer electrolyte membrane 38 from the contact surface 36a of the cathode-side separator 36.

In third embodiment, the contact surface 98a of the cathode-side current collector 98 having the smaller contact area protrudes toward the solid polymer electrolyte membrane 38 from the contact surface 36a of the cathode-side separator 36. Therefore, when the cathode-side current collector 98 is pressed toward the anode-side current collector 96 by the load applying mechanism 45, the pressing force of the cathode-side current collector 98 can be applied only to the anode-side current collector 96.

Thus, a desired surface pressure can be reliably applied to the anode catalyst layer 40a and the cathode catalyst layer 42a formed on either side of the solid polymer electrolyte membrane 38. Consequently, the advantageous effects in the first and second embodiments can be achieved also in the third embodiment.

The invention claimed is:

1. An electrochemical device comprising
an electrolyte membrane,
a first catalyst and an anode current collector stacked on one surface of the electrolyte membrane,
a second catalyst and a cathode current collector stacked on an opposite surface of the electrolyte membrane,
a first separator stacked on the anode current collector, the first separator having a planar contact surface,
a first flow path, for supplying water, formed between the anode current collector and the first separator,
a second separator stacked on the cathode current collector, the second separator having a planar contact surface, and
a second flow path, for collecting hydrogen generated by an electrolysis of the water, formed between the cathode current collector and the second separator, a pressure of the hydrogen being higher than a pressure of the water,
wherein a load applying mechanism for pressing the cathode current collector onto the electrolyte membrane is interposed between the cathode current collector and the second separator,
the anode current collector and the cathode current collector have different stack areas on the electrolyte membrane, and
the anode current collector is fitted into an inner periphery of a frame member, and
the anode current collector is thicker than the frame member so that an anode current collector surface stacked on the electrolyte membrane uniformly protrudes from the frame member and the first separator toward the electrolyte membrane.

2. The electrochemical device according to claim 1, wherein a gap between an outer periphery of the cathode current collector and an inner periphery of the second separator is larger than a gap between an outer periphery of the anode current collector and an inner periphery of the first separator.

3. The electrochemical device according to claim 1, wherein a stack area of the anode current collector is larger than an area of the first catalyst, and a stack area of the cathode current collector is larger than an area of the second catalyst.

4. The electrochemical device according to claim 1, wherein the load applying mechanism contains a disc spring.

5. The electrochemical device according to claim 1, wherein a stack area of the anode current collector is smaller than a stack area of the cathode current collector.

\* \* \* \* \*